(12) United States Patent
Nicot et al.

(10) Patent No.: US 7,196,615 B2
(45) Date of Patent: Mar. 27, 2007

(54) SYSTEM AND METHOD FOR DETERMINING AT LEAST ONE PARAMETER OF AT LEAST ONE ROTATING MEMBER BY MEANS OF A POSITION SIGNAL

(75) Inventors: Christophe Nicot, Quintal (FR); Christophe Duret, Quintal (FR)

(73) Assignee: S.N.R. Roulements, Annecy Cedex (FR)

( * ) Notice: Subject to any disclaimer, the term of this patent is extended or adjusted under 35 U.S.C. 154(b) by 229 days.

(21) Appl. No.: 10/982,815

(22) Filed: Nov. 8, 2004

(65) Prior Publication Data
US 2005/0110624 A1  May 26, 2005

(30) Foreign Application Priority Data
Nov. 21, 2003  (FR) ................................. 03 50881

(51) Int. Cl.
*B60C 23/00* (2006.01)

(52) U.S. Cl. .................. 340/442; 340/445; 340/10.1; 73/146; 307/9.1; 307/10.1

(58) Field of Classification Search ................. 340/442
See application file for complete search history.

(56) References Cited

U.S. PATENT DOCUMENTS

| | | | | |
|---|---|---|---|---|
| 5,808,190 A | * | 9/1998 | Ernst | 340/445 |
| 5,883,305 A | * | 3/1999 | Jo et al. | 73/146.5 |
| 6,112,587 A | * | 9/2000 | Oldenettel | 340/447 |
| 6,278,363 B1 | * | 8/2001 | Bezek et al. | 340/442 |
| 6,591,671 B2 | * | 7/2003 | Brown | 340/442 |
| 6,630,885 B2 | * | 10/2003 | Hardman et al. | 340/442 |
| 6,690,271 B2 | * | 2/2004 | Fischer et al. | 340/447 |
| 6,922,140 B2 | * | 7/2005 | Hernando et al. | 340/444 |
| 7,015,802 B2 | * | 3/2006 | Forster | 340/447 |
| 2002/0067285 A1 | * | 6/2002 | Lill | 340/870.11 |
| 2005/0087593 A1 | * | 4/2005 | Benedict | 235/375 |
| 2005/0172707 A1 | * | 8/2005 | Kanatani et al. | 73/146 |

\* cited by examiner

*Primary Examiner*—Daniel Wu
*Assistant Examiner*—Eric M. Blount
(74) *Attorney, Agent, or Firm*—Arent Fox PLLC

(57) ABSTRACT

A system for determining at least one parameter of at least one member rotating with respect to a fixed structure, the system including, for each rotating member, an assembly having a transponder, a coder, a position sensor, and a device for detecting the parameter or parameters issuing from the transponder. The system also includes a synchronisation unit connected to each sensor and to each detection device. The synchronisation unit including a device for determining an activation position of the detection device of an assembly when the transponder of the assembly is in the transmission/reception cone of the communication mechanism of the detection device, and an activation device that is able, by comparing the position of the coder with the activation position, to activate the detection device of the assembly in order to measure the parameter or parameters.

15 Claims, 1 Drawing Sheet

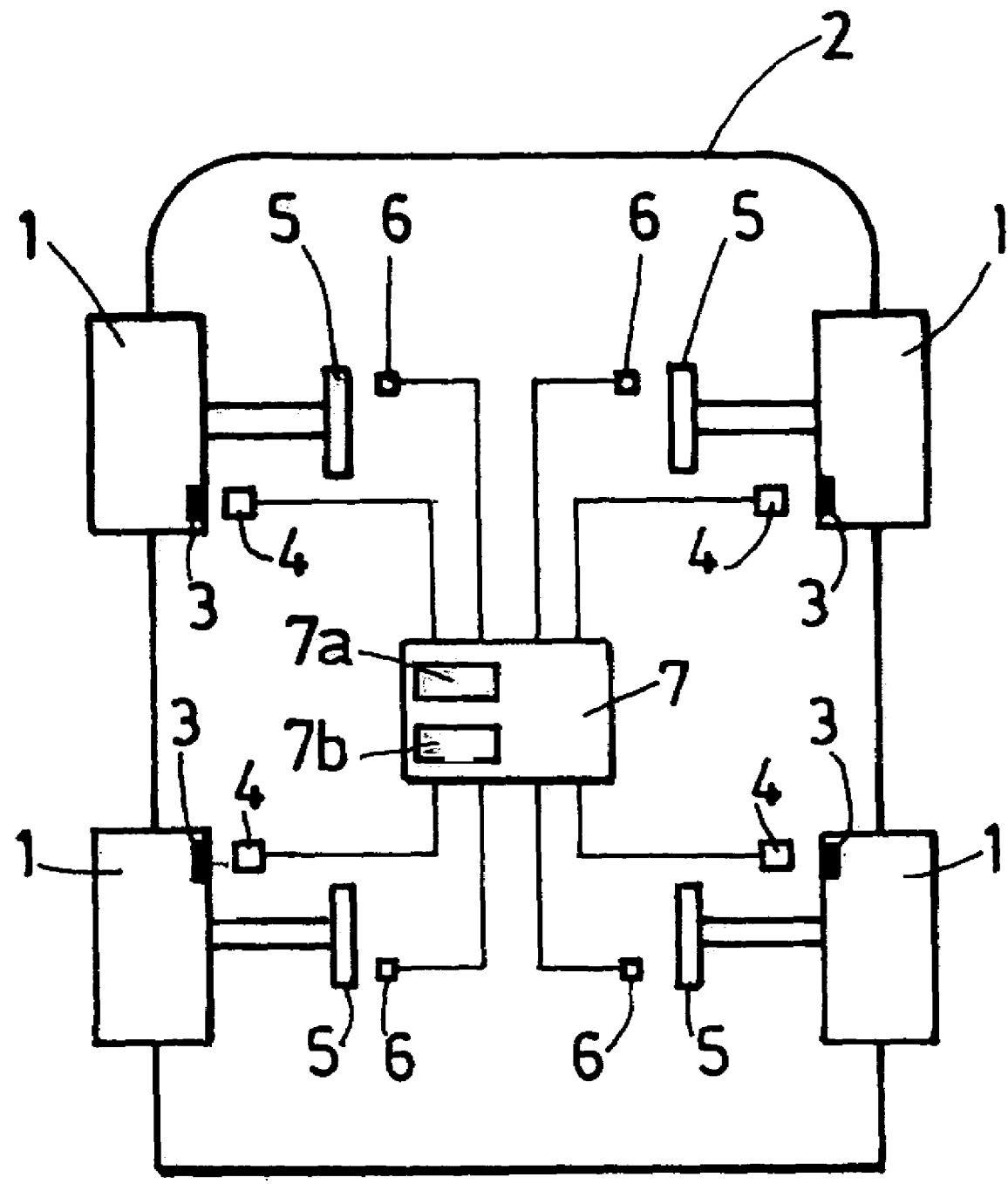

SYSTEM AND METHOD FOR DETERMINING AT LEAST ONE PARAMETER OF AT LEAST ONE ROTATING MEMBER BY MEANS OF A POSITION SIGNAL

BACKGROUND OF THE INVENTION

1. Field of the Invention

The invention concerns a system for determining at least one parameter of at least one member rotating with respect to a fixed structure, a method of determining at least one such parameter and a motor vehicle comprising such a system.

2. Description of Related Art

The invention applies typically to the determination of at least one parameter such as the pressure, temperature, deformation or wear of a motor vehicle tyre.

To do this, it is known how to use, for each tyre:

a transponder which is rotationally fixed to the tyre, the said transponder being able to measure the parameter or parameters; and a device for detecting the parameter or parameters issuing from the transponder, the said device being fixed to the chassis of the vehicle and comprising an antenna able to transmit an excitation signal to the transponder and to receive the measurement or measurements.

To allow communication between the transponder and the detection device, the antenna on the latter is positioned close to the area of movement of the transponder, typically in the wheel passage.

Thus, by activating the detection device, it is possible to periodically obtain the value of the parameter or parameters measured by the transponder and to make this value available to a system, for example a safety system on the vehicle, which monitors and/or uses it.

One problem which is posed concerns the establishment of a procedure for activating the detection device which makes it possible to obtain satisfactory communication between the said device and the transponder. This is because, the antenna having a given transmission/reception cone, the activation must be effected when the transponder is situated in this cone.

According to a first solution, it has been proposed to activate the detection device continuously, but this presents several drawbacks. First of all, it gives rise to high electrical consumption, partly unnecessary when the transponder is not situated in the transmission/reception cone. In addition, it acts on the transponder at each rotation, which, under certain running conditions, is unnecessary and, in the case of an active transponder, consumes its battery power unnecessarily.

In order to attempt to limit the electrical consumption, it has been proposed, according to a second solution, to activate the detection device at a fixed frequency. However, this solution also presents several drawbacks. First of all, it does not make it possible to ensure that the transponder is in the transmission/reception cone when the detection device is activated. In particular, for a given activation frequency, there exist speeds of rotation of the transponder for which this condition is not fulfilled, which is incompatible with a use of the parameter or parameters in a safety function for the vehicle. In addition, this solution does not guarantee a determination of the parameter or parameters at a given frequency, for example according to the operating conditions of the vehicle.

In order to attempt to resolve the drawbacks of this second solution, it has been proposed to increase the size of the antenna so as to increase the corresponding transmission/reception cone. However, apart from the fact that this possibility can only limit these drawbacks without completely resolving them since a shadow area in the communication is always present, the increase in the size of the antenna causes increased integration constraints in the wheel arch as well as a higher power and therefore electrical consumption.

BRIEF SUMMARY OF THE INVENTION

To resolve all these drawbacks, the invention proposes in particular a determination system which makes it possible to synchronise communication between the antenna and the transponder when the latter is in the transmission/reception cone, so as to make the communication secure whilst optimising electrical consumption, whilst being able to adapt the communication frequency to operating conditions of the vehicle.

To this end, and according to a first aspect, the invention proposes a system for determining at least one parameter of at least one member rotating with respect to a fixed structure, the said system comprising, for each rotating member, an assembly comprising:

a transponder rotationally fixed to the rotating member, the said transponder being able to measure the parameter or parameters to be determined;

a coder rotationally fixed to the rotating member;

a sensor fixed to the fixed structure, the said sensor being disposed opposite to and at a reading distance from the coder, the said sensor comprising an electronic circuit able to deliver a signal representing the angular position of the coder with respect to the fixed structure;

a device for detecting the parameter or parameters issuing from the transponder, the said device being fixed to the fixed structure and comprising a communication means able to transmit an excitation signal to the transponder and to receive the measurement or measurements;

the said system also comprising:

a synchronisation unit which is connected to each sensor and to each detection device, the said unit comprising a device for determining an activation position of the detection device of an assembly when the transponder of the assembly is in the transmission/reception cone of the communication means of the said detection device, and an activation device able, by comparing the position of the coder with the activation position, to activate the detection device of the assembly in order to measure the parameter or parameters.

In one embodiment, the activation device comprises means of resetting the position signal of the coder with respect to the activation position.

According to a second aspect, the invention proposes a method of determining at least one parameter of at least one member rotating with respect to a fixed structure by means of such a system, comprising an initial procedure of determining an activation position and then, when the position of the coder is equal to the said activation position, the activation device activates or enables the activation of the detection device.

In a particular embodiment, when the activation device comprises resetting means, the determination method comprises an initial procedure of determining an activation position, after which the position signal of the coder is reset with respect to the said activation position in order, according to the reset position of the coder, to allow or enable the activation of the detection device.

According to a third aspect, the invention proposes a motor vehicle comprising such a system, each assembly being disposed so as to determine at least one parameter of a tyre of the said vehicle.

Other objects and advantages of the invention will emerge during the following description given with reference to the accompanying drawing, which schematically depicts a vehicle comprising a determination system according to the invention.

BRIEF DESCRIPTION OF DRAWINGS

The FIGURE is a schematic diagram illustrating the present invention according to a preferred embodiment.

DETAILED DESCRIPTION OF PREFERRED EMBODIMENTS

The invention concerns a system for determining at least one parameter of at least one rotating member 1 in rotation with respect to a fixed structure 2. According to the embodiment described in relation to the FIGURE, this system is intended for determining at least one parameter of at least one tyre 1 of a motor vehicle. In particular, the system allows the determination of the pressure, the temperature, the deformation and/or the wear of all the tyres 1 on the vehicle.

To do this, the system comprises, for each tyre 1, an assembly comprising a transponder 3 able to measure the parameter or parameters to be determined, and a device 4 for detecting the parameter or parameters issuing from the transponder 3. The transponder 3 is rotationally fixed to the tyre 1 and the detection device 4 is fixed, close to the transponder 3, to the chassis 2 of the vehicle. According to other applications, the transponder 3 can be fixed to the wheel or to the bearing on which the wheel is mounted.

The determination system makes it possible, by activating the detection device 4, to periodically obtain the value of the parameter or parameters measured by the transponder 3 and to make this value available to a system which is fixed with respect to the chassis 2, for example a vehicle safety system, which monitors and/or uses it. In particular, the automatic determination of the parameter or parameters can make it possible to warn the driver in the event of abnormality. In addition, the parameter or parameters can be used in driving aid systems such as wheel anti-locking (ABS), direction control (ESP) or electrical steering assistance (ESA), so as to adapt the action of these systems according to the value of the parameters determined.

An assembly consisting of transponder 3 and detection device 4 is known from the prior art:

- the detection device 4 comprising a communication means, for example in the form of a directional antenna, able to transmit an excitation signal, for example RF, to the transponder 3 and to receive the measurement or measurements; and
- the transponder 3 being able to be of the active type or of the passive type depending on whether it is supplied by its own battery in order to perform the measurement and communication or whether these functions are induced by the excitation signal issuing from the detection device 4. For determining the pressure of the tyre 1, the transponder 3 can be of the surface acoustic wave (SAW) type.

In the vehicle according to the invention, the antenna is housed in the wheel arch on which the tyre 1 is mounted and the transponder 3 is housed in the valve of the tyre 1. Thus the distance between antenna and transponder 3 is reduced, which makes it possible to optimise the electrical power necessary for the communication of the measurements between the tyre 1 and the chassis 2. In a variant, it is also possible to provide for the transponder 3 to be disposed in the tread of the tyre 1, in particular in order to measure the deformation and wear thereof.

The assembly also comprises a coder 5 rotationally fixed to the tyre 1 and a sensor 6 fixed to the chassis 2 of the vehicle. In particular, the coder 5 and/or the sensor 6 can be disposed at the wheel bearing, as described for example in the document FR-2 700 588 issuing from the applicant. The coder 5 can in particular be rotationally fixed to the rotating race of the bearing and the sensor 6 can be associated with the fixed race or dissociated from it, in order to be opposite to and at a reading distance from the coder 5.

The function of the coder 5 is to deliver angular position information on the tyre 1. According to one embodiment, the coder 5 is formed from a magnetic ring comprising on its surface a track formed from a succession of North and South poles.

Opposite to and at a reading distance from the coder 5 there is provided the sensor 6 which comprises an electronic circuit able to deliver a signal representing the angular position of the coder 5 with respect to the chassis 2.

According to one embodiment, the sensor 6 comprises at least two sensitive elements positioned opposite the track. In one particular example, the sensitive elements are chosen from the group comprising Hall effect sensors, magnetoresistors and giant magnetoresistors.

The sensor 6 used in this embodiment is able to deliver two periodic electrical signals S1, S2 in quadrature by means of the sensitive elements. Moreover, the principle of obtaining the signals S1 and S2 from a plurality of aligned sensitive elements is for example described in the document FR-2 792 403 issuing from the applicant.

From the signals S1, S2, the electronic circuit is able to deliver square digital position signals A, B in quadrature which represent the angular position of the coder but also its speed of rotation and its direction of rotation.

According to one embodiment, the electronic circuit also comprises an interpolator, for example of the type described in the document FR-2 754 063 issuing from the applicant, making it possible to increase the resolution of the output signals. In particular, a resolution of the angular position of the coder 5 of less than 1° can be obtained.

The sensor 6 can be integrated on a silicon substrate or equivalent, for example AsGa, so as to form an integrated circuit personalised for a specific application, a circuit sometimes termed an ASIC in order to refer to the integrated circuit designed partially or completely according to requirements.

Although the description is given in relation to a magnetic sensor/coder assembly, it is also possible to implement the invention in a similar fashion using a technology of the optical type. For example, the coder 5 can be formed from a metal or glass target on which the main track and rotation pulse track have been etched so as to form an optical pattern similar to the multipole magnetic pattern disclosed above, the sensitive elements then being formed from optical detectors.

The electronic circuit comprises counting means able to determine, from an initial position, the variations in the angular position of the coder 5. In one example embodiment, the counting means comprise a register in which the value of the angular position is incremented or decremented by an angular value corresponding to the number of edges of the signals A and B which are detected, the initial value being for example fixed at zero when the system is commissioned. Thus the processing device makes it possible to know the relative position of the coder 5 with respect to the initial position.

In addition to the assembly or assemblies, the system comprises a synchronisation unit 7, in the form of a computer, which is connected to each sensor 6 and to each detection device 4. The unit comprises a device 7a for determining an activation position of the detection device of an assembly when the transponder 3 of the assembly is in the transmission/reception cone of the antenna of the said detection device, and an activation device 7b able, by comparing the position of the coder with the activation position, to activate the detection device 4 in order to measure the parameter or parameters.

The unit 7 makes it possible to synchronise the passage of the transponder 3 in the cone with the activation of the detection device 4 so as to optimise the life of the battery supplying the unit 7 and, where applicable, of the battery supplying the transponder 3 in the case where the latter is active.

In one embodiment, the activation device 7b comprises means of resetting the position signal of the coder 5 with respect to the activation position, so as to deliver an absolute position signal of the said coder 5 with respect to the said position, and therefore an absolute position signal of the tyre 1 since the coder 5 is rotationally fixed to the latter.

A determination method using a system according to the invention comprises an initial procedure of determining an activation position and then, when the position of the coder 5 is equal to the said activation position, the activation device activates or enables the activation of the detection device 4.

When the activation device 7b comprises resetting means, the method, after the determination of the activation position, provides for the resetting of the position signal of the coder 5 with respect to the said activation position in order, according to the reset position of the coder, to allow or enable the activation of the detection device 4.

When the activation device 7b enables activation, provision may be made for effecting the said activation at variable interrogation periods which are determined according to the operating conditions of the tyre 1. In particular, these conditions can be a function of the parameter or parameters measured (pressure, temperature), the running conditions of the vehicle such as the speed or state of the road (rain or snow condition for example), or the position of the tyre 1 (front or rear).

In one example embodiment, at least one speed threshold for the vehicle can be defined so that:
  below the threshold, the activation is effected at a frequency $f_i$;
  above the threshold, the activation is effected at a frequency which is a multiple of $f_i$.

It may also be decided to determine the pressure of the rear tyres 1 more frequently than those of the front tyres.

To do this, the synchronisation unit 7 is also supplied with the pertinent parameters and with the required conditions, the said device comprising means of timing the activation when this is enabled.

According to one embodiment, the initial determination procedure can be carried out by activation of the detection device 4 at a fixed frequency, for example every second and, when the signal measured by the detection device 4 is satisfactory, determination and recording in the activation device 7b of the activation position which is equal to the position of the coder 5.

This procedure is triggered each time the determination system is brought into service, before the determination of the parameter or parameters according to the invention.

According to one embodiment, provision can be made for an iterative procedure of optimisation of the activation position, the said procedure being able to be detected continuously or periodically.

The optimisation procedure can provide for analysing the quality of the signal issuing from the detection device 4, for example its signal to noise ratio, the communication error rate or the power communicated. If this quality is below a first threshold, incrementing and/or decrementing the activation position by a given step, for example one degree. Iteratively, the procedure makes it possible, by analysing the quality of the corresponding signal, to increment or decrement the activation position in order to obtain an optimised activation position in which the quality of the signal is maximum. This optimised position is used subsequently as a new activation position.

According to one embodiment of the method, a second quality signal threshold, lower than the first, is used in the synchronisation unit 7. It is thus possible to make provision, if the quality of the signal is below the second threshold, for triggering the position of determining an activation position in place of the optimisation procedure. In particular this embodiment makes it possible, in the case of the electrical supply being cut off in the system when the parameter or parameters are being determined, to initiate a determination procedure for resetting the synchronisation. In addition, if the optimisation procedure does not make it possible to converge towards an optimised position, this embodiment also makes it possible to initiate a determination procedure during optimisation.

The invention claimed is:

1. A system for determining at least one parameter of at least one member rotating with respect to a fixed structure, the system comprising, for each rotating member, an assembly comprising:
  a transponder rotationally fixed to the rotating member, the transponder being able to measure the parameter or parameters to be determined;
  a coder rotationally fixed to the rotating member;
  a sensor fixed to the fixed structure, the sensor being disposed opposite to and at a reading distance from the coder, the sensor comprising an electronic circuit able to deliver a signal representing the angular position of the coder with respect to the fixed structure;
  a detection device for detecting the parameter or parameters issuing from the transponder, the detecting device being fixed to the fixed structure and comprising a communication means able to transmit an excitation signal to the transponder and to receive the measurement or measurements; and
  a synchronisation unit connected to each sensor and to each detection device, the unit comprising a determining device for determining an activation position of the detection device of an assembly when the transponder of the assembly is in the transmission/reception cone of the communication means of the detection device, and an activation device that is able, by comparing the position of the coder with the activation position, to activate the detection device of the assembly in order to measure the parameter or parameters.

2. The system according to claim 1, wherein the activation device comprises means of resetting the position signal of the coder with respect to the activation position.

3. The system according to claim 1 or 2, wherein the coder is formed from a magnetic ring comprising on a surface a track formed by a succession of North and South poles.

4. A method of determining at least one parameter of at least one member rotating with respect to a fixed structure by means of a system according to claim 1, wherein the method comprises an initial procedure of determining an activation position and then, when the position of the coder is equal to the activation position, the activation device activates or enables the activation of the detection device.

5. A method of determining at least one parameter of at least one member rotating with respect to a fixed structure by means of a system according to claim 2, wherein the method further comprises an initial procedure of determining an activation position, after which the position signal of the coder is reset with respect to the activation position in order, according to the reset position of the coder, to allow or enable the activation of the detection device.

6. The method according to claim 4 or 5, wherein the initial determination procedure is implemented by activating the detection device at a fixed frequency and, when the signal measured by the detection device is satisfactory, determining the activation position which is equal to the position of the coder.

7. The method according to claim 4 or 5, wherein the method further comprises an iterative procedure of optimising the activation position in which the quality of the signal issuing from the detection device is analysed and, if the quality is lower than a first threshold, the activation position is incremented and/or decremented by a given step in order to determine a new optimised position which is used subsequently by the activation device as the new activation position.

8. The method according to claim 7, wherein, if the quality of the signal is below a second threshold which is below the first threshold, the procedure of determining an activation position is implemented in place of the optimisation procedure.

9. The method according to claim 4 or 5, wherein, when the activation device enables activation, activation is effected at variable interrogation periods which are determined according to operating conditions of the rotating member.

10. The motor vehicle comprising a system according to claim 1 or 2, each assembly being disposed so as to determine at least one parameter of a tyre of the vehicle.

11. The vehicle according to claim 10, wherein the communication means is housed in an arch of the wheel on which the tyre is mounted and in that the transponder is housed in the valve of the tyre.

12. The method according to claim 6, further comprising an iterative procedure of optimising the activation position in which the quality of the signal issuing from the detection device is analysed and, if the quality is lower than a first threshold, the activation position is incremented and/or decremented by a given step in order to determine a new optimised position which is used subsequently by the activation device as the new activation position.

13. The method according to claim 12, in which, if the quality of the signal is below a second threshold which is below the first threshold, the procedure of determining an activation position is implemented in place of the optimisation procedure.

14. The motor vehicle comprising a system according to claim 3, wherein each assembly is disposed so as to determine at least one parameter of a tyre of the vehicle.

15. The vehicle according to claim 14, wherein the communication means is housed in an arch of the wheel on which the tyre is mounted and in that the transponder is housed in the valve of the tyre.

* * * * *